(12) United States Patent
Marcotte

(10) Patent No.: US 8,321,389 B2
(45) Date of Patent: Nov. 27, 2012

(54) METHOD, APPARATUS AND COMPUTER PROGRAM PRODUCT FOR MAINTAINING FILE SYSTEM CLIENT DIRECTORY CACHES WITH PARALLEL DIRECTORY WRITES

(75) Inventor: Scott Thomas Marcotte, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 12/350,475

(22) Filed: Jan. 8, 2009

(65) Prior Publication Data

US 2010/0174690 A1  Jul. 8, 2010

(51) Int. Cl.
*G06F 7/00* (2006.01)
*G06F 17/30* (2006.01)

(52) U.S. Cl. ........................................ 707/695; 707/806

(58) Field of Classification Search ............... 707/999.2, 707/695, 736, 737, 826, 806; 709/203, 219, 709/201
See application file for complete search history.

(56) References Cited

U.S. PATENT DOCUMENTS

| | | | |
|---|---|---|---|
| 5,546,580 A | | 8/1996 | Seliger et al. |
| 5,974,424 A | | 10/1999 | Schmuck et al. |
| 6,032,216 A | | 2/2000 | Schmuck et al. |
| 6,363,387 B1 | | 3/2002 | Ponnekanti et al. |
| 7,085,787 B2 | | 8/2006 | Beier et al. |
| 7,707,165 B1 | * | 4/2010 | Jiang et al. ..................... 707/806 |
| 7,725,456 B2 | * | 5/2010 | Augustine ..................... 707/713 |
| 8,108,347 B2 | * | 1/2012 | Lara et al. ..................... 707/638 |
| 2002/0138555 A1 | * | 9/2002 | Yu ................................ 709/203 |
| 2002/0161860 A1 | * | 10/2002 | Godlin et al. ................. 709/219 |
| 2005/0039049 A1 | | 2/2005 | Chang et al. |
| 2005/0216421 A1 | * | 9/2005 | Barry et al. ..................... 705/64 |
| 2006/0047819 A1 | | 3/2006 | Caddes et al. |
| 2008/0040395 A1 | * | 2/2008 | Danoyan ....................... 707/200 |
| 2009/0043963 A1 | * | 2/2009 | Lahcanski et al. ............. 711/115 |
| 2010/0016288 A1 | * | 1/2010 | Bothmann et al. ........ 514/217.04 |

OTHER PUBLICATIONS

"Procedure for Updating Replicated Directories", Austin et al., IBM TDB n10a Mar. 1991 p. 335-357.
"Laziest Write Posting on Bus-Based SMPs", Yongjoon Lee, IEEE 2000, pp. 21-25.
"Performance of Concurrency Control Schemes in Data Warehousing Systems", Kim et al., IEICE Transactions on Information and Systems, vol. E86-D, No. 11, Nov. 2003, pp. 2395-2406.
"Supporting Updates in Heterogeneous Distributed Database Systems", Elmagarmid et al., IEEE Feb. 1988, pp. 564-569.

\* cited by examiner

*Primary Examiner* — Jacob F Bétit
*Assistant Examiner* — Bao Tran
(74) *Attorney, Agent, or Firm* — William A. Kinnaman, Jr.

(57) ABSTRACT

A cached version of a file system directory is synchronized with a server version of the directory in a distributed file system. Both a server and a client specify version numbers for their directory versions. On receiving a request from the client specifying a directory update, the server updates its version, increments its version number, and transmits a reply to the client containing a change log with the incremented version number. Upon receiving the reply, the client compares the received version number with that of its cached version. If the version number matches that of the next expected update, the client applies the updates to its cached version and increments its version number. Otherwise, it adds the received change log to a change log queue for the directory without incrementing the last applied version. Mechanisms are provided for handling parallel read and update requests without awaiting replies from the server.

12 Claims, 12 Drawing Sheets

Logic for file system server directory update

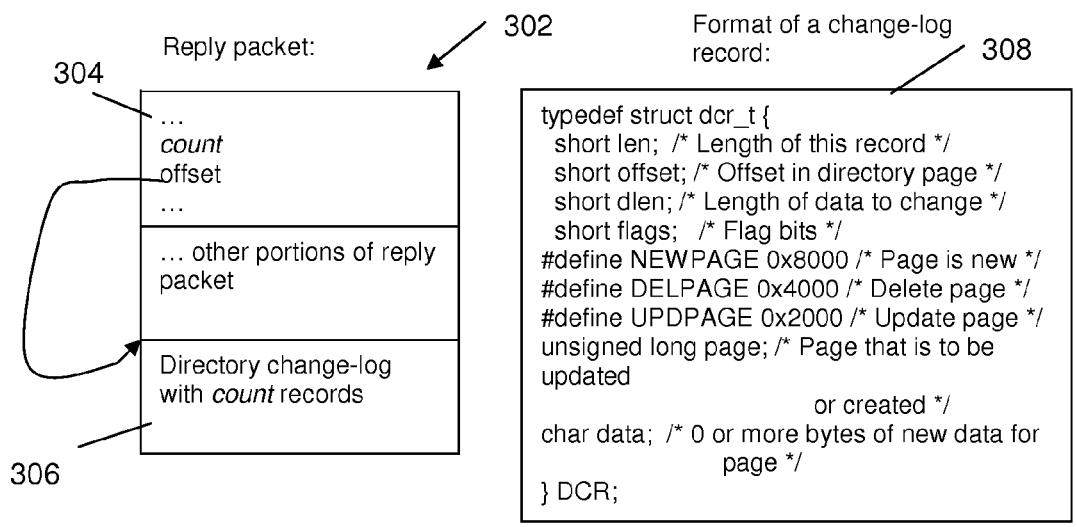
Figure 3: Description of a directory change log

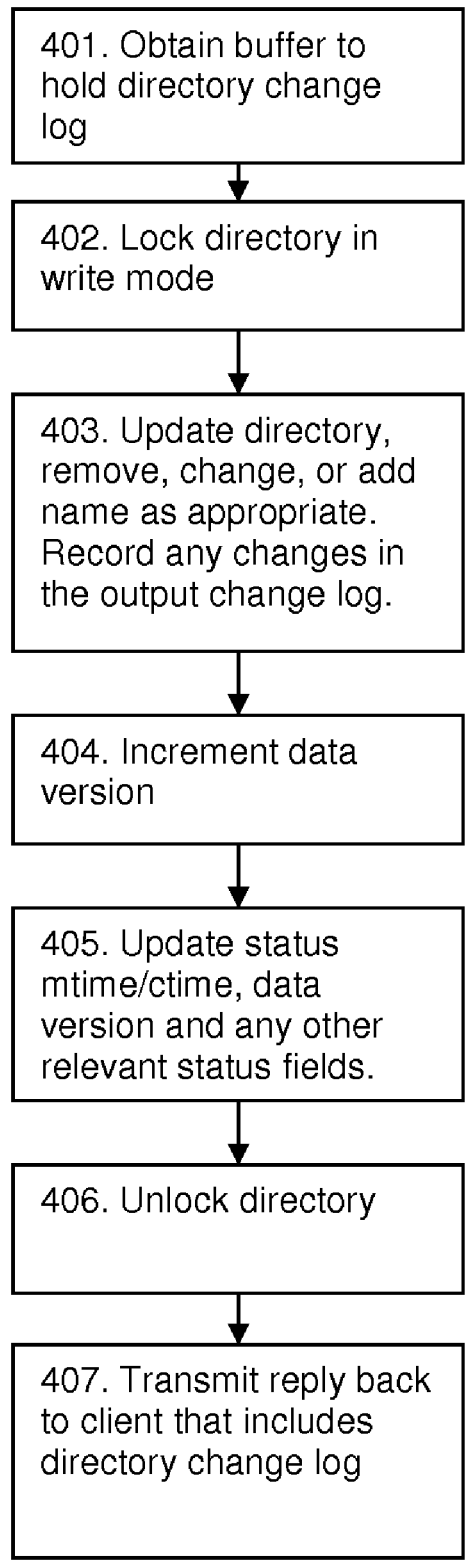
Figure 4: Logic for file system server directory update

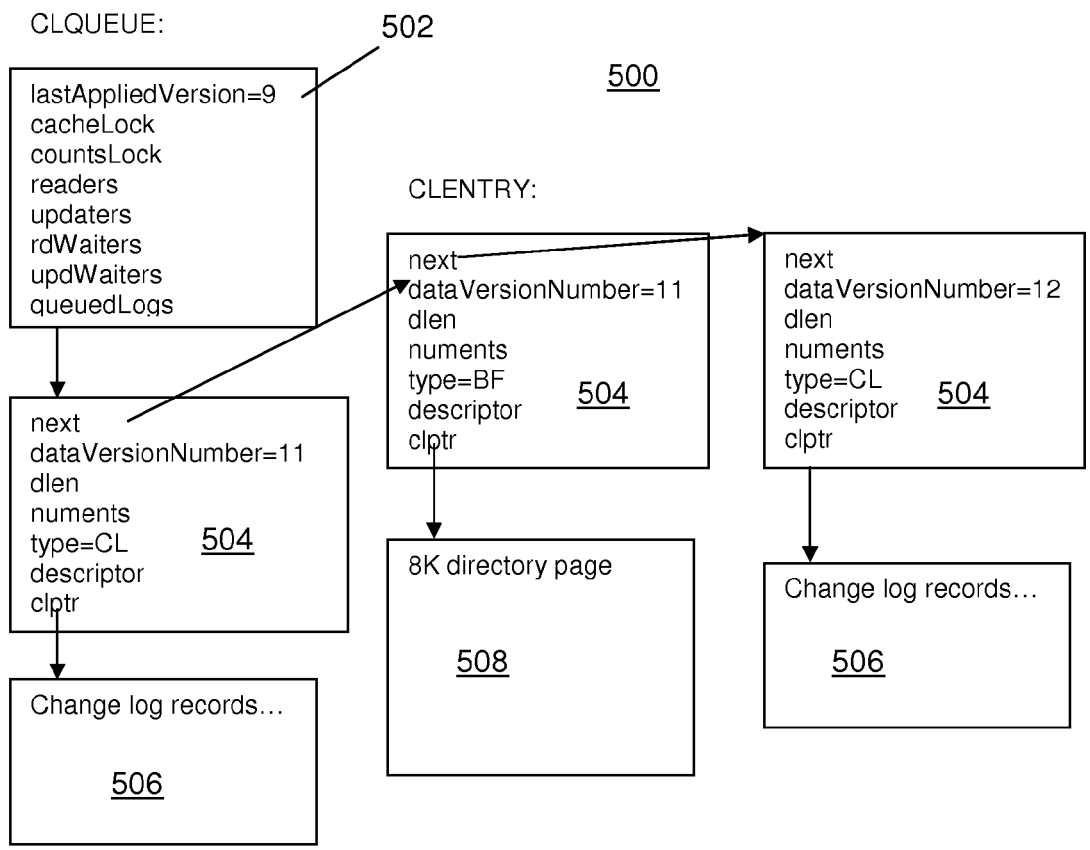
Figure 5: An example of a client change log queue

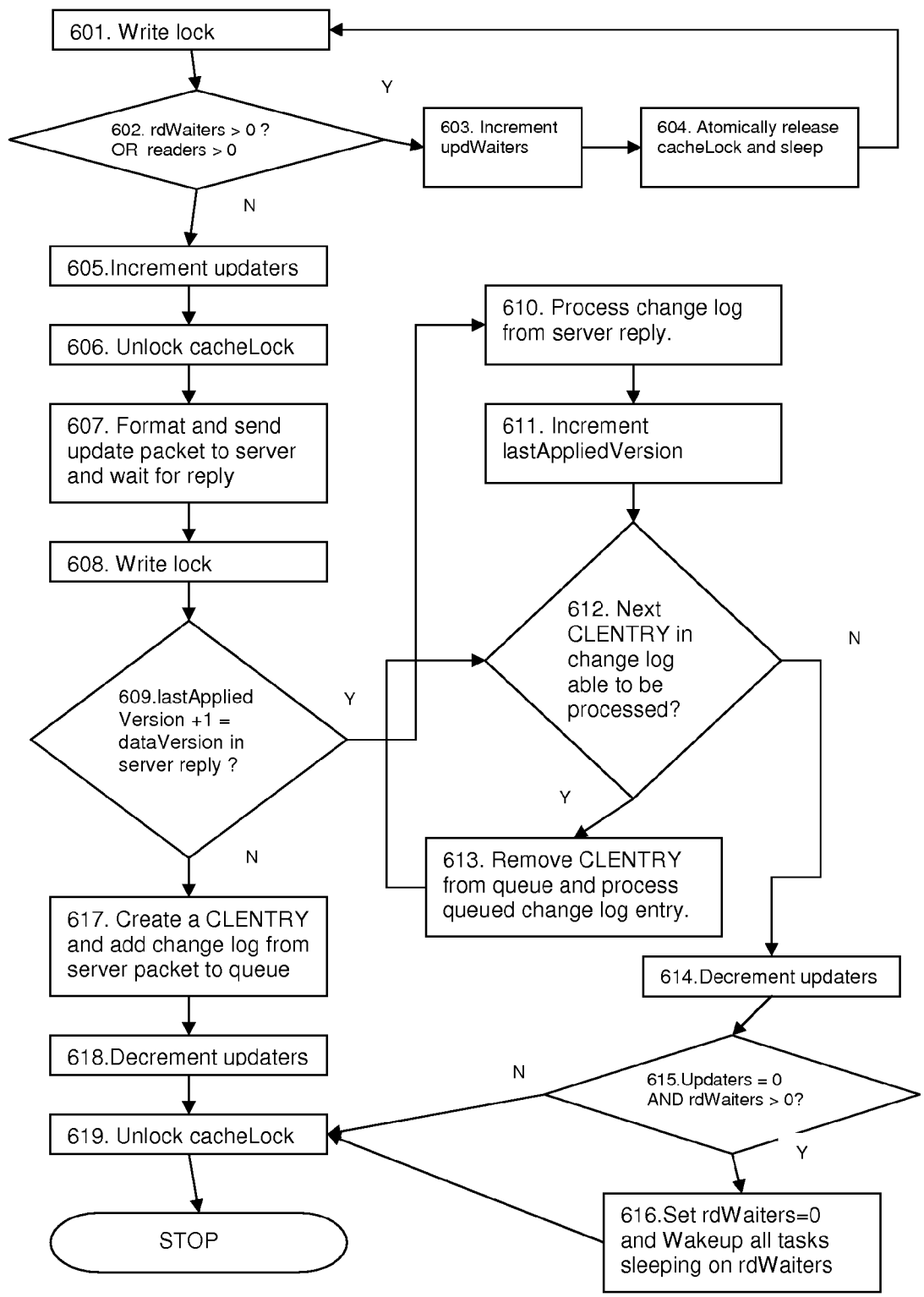
Figure 6: Client Directory Update Logic

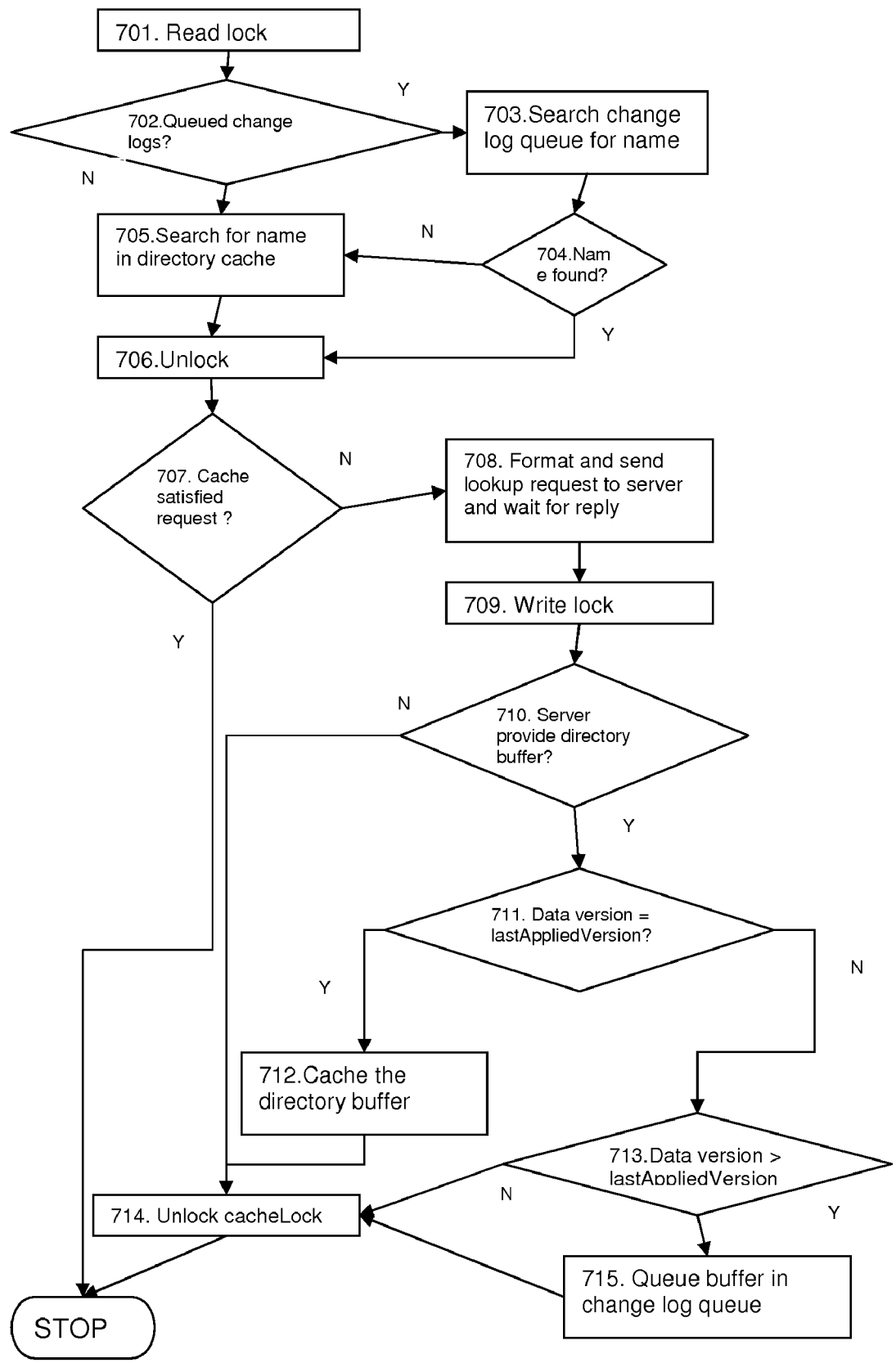
Figure 7: Client Lookup Logic

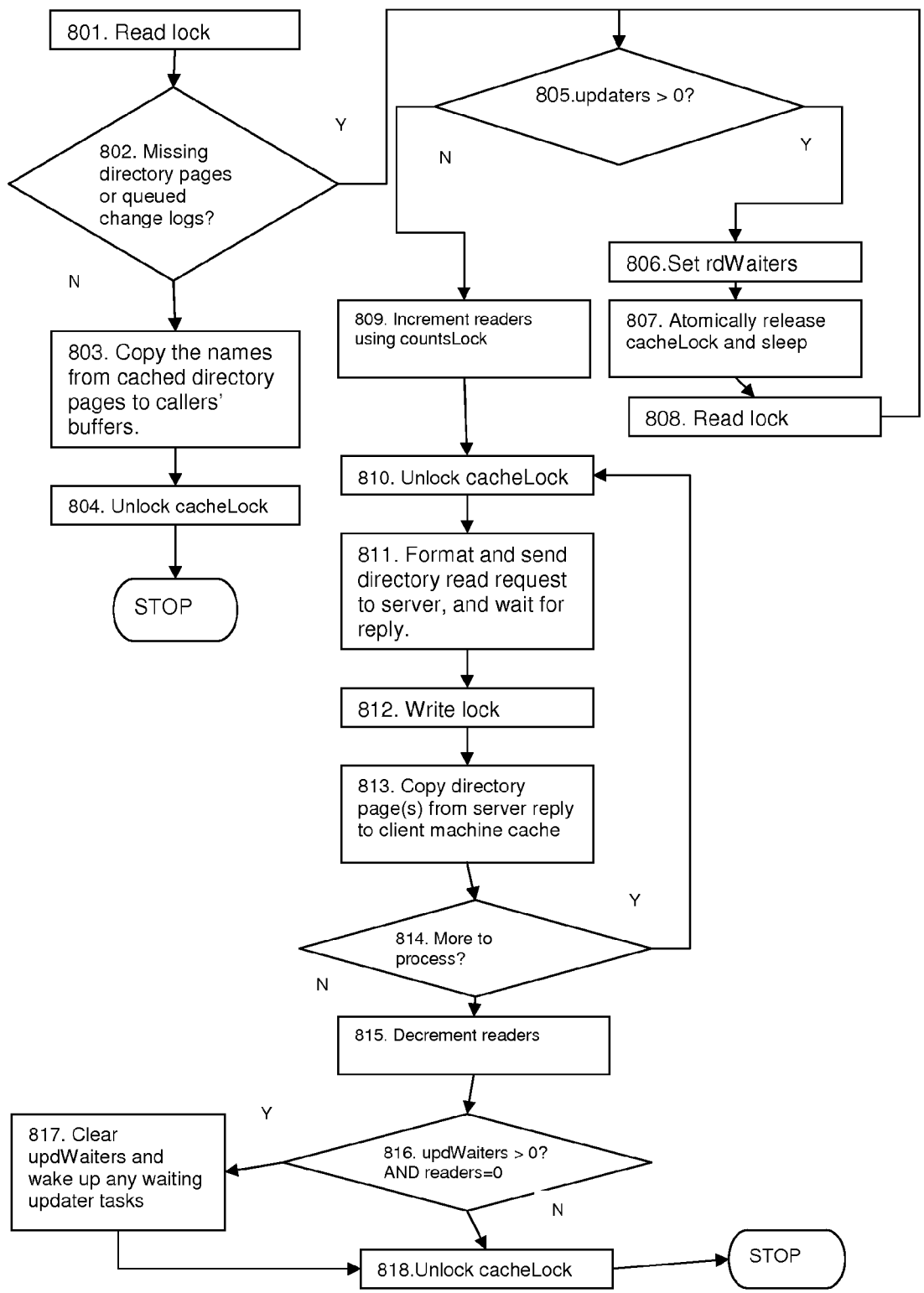
Figure 8: readdir Logic

Format of a change-log record for direct
disk access client: record:

```
typedef struct dcr_t {
  short len;          /* Length of this record */
  short offset;       /* Offset in directory page */
  short dlen;         /* Length of data to change */
  short flags;        /* Flag bits */
  #define NEWPAGE 0x8000  /* Page is new */
  #define DELPAGE 0x4000  /* Delete page */
  #define UPDPAGE 0x2000  /* Update page */
  #define COWPAGE 0x1000  /* New page from backup copy */
  unsigned long page;             /* Logical page that is to be updated or created */
  unsigned long physPage;         /* Physical page on disk that contains page */
  unsigned long ibs[3];           /* Indirect blocks that locate the page.  High order bit
                                     is set if indirect block newly allocated */
  int indexes[3];                 /* Indexes into each indirect block to locate page */
  unsigned log cowlbs[3];         /* Original indirect blocks if indirect blocks
                                     themselves were copy on write */
  char data;                      /* 0 or more bytes of new data for page */
} DCR;
```

Figure 9: Change log for direct disk access client

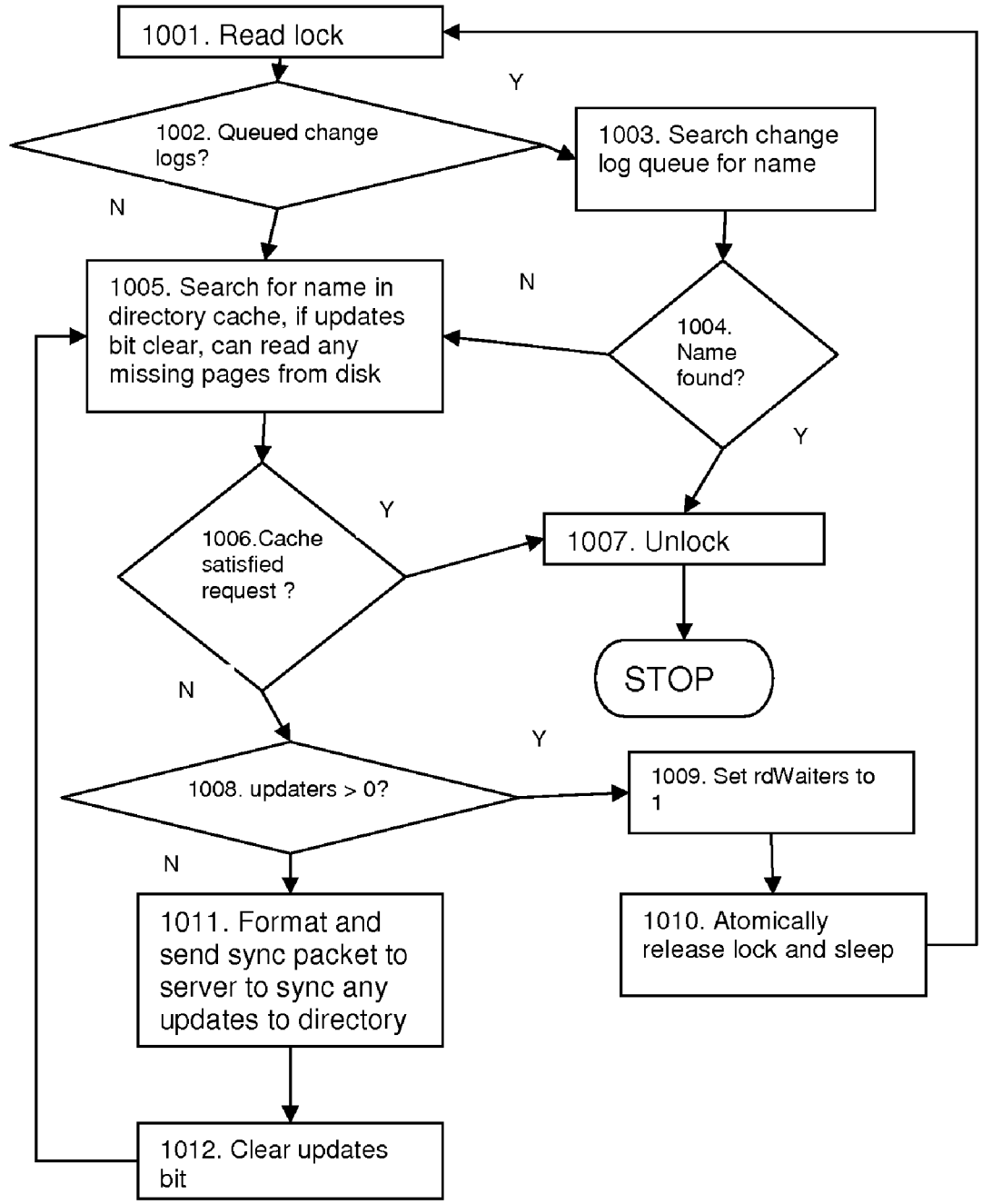
Figure 10: Lookup logic for client with direct disk access

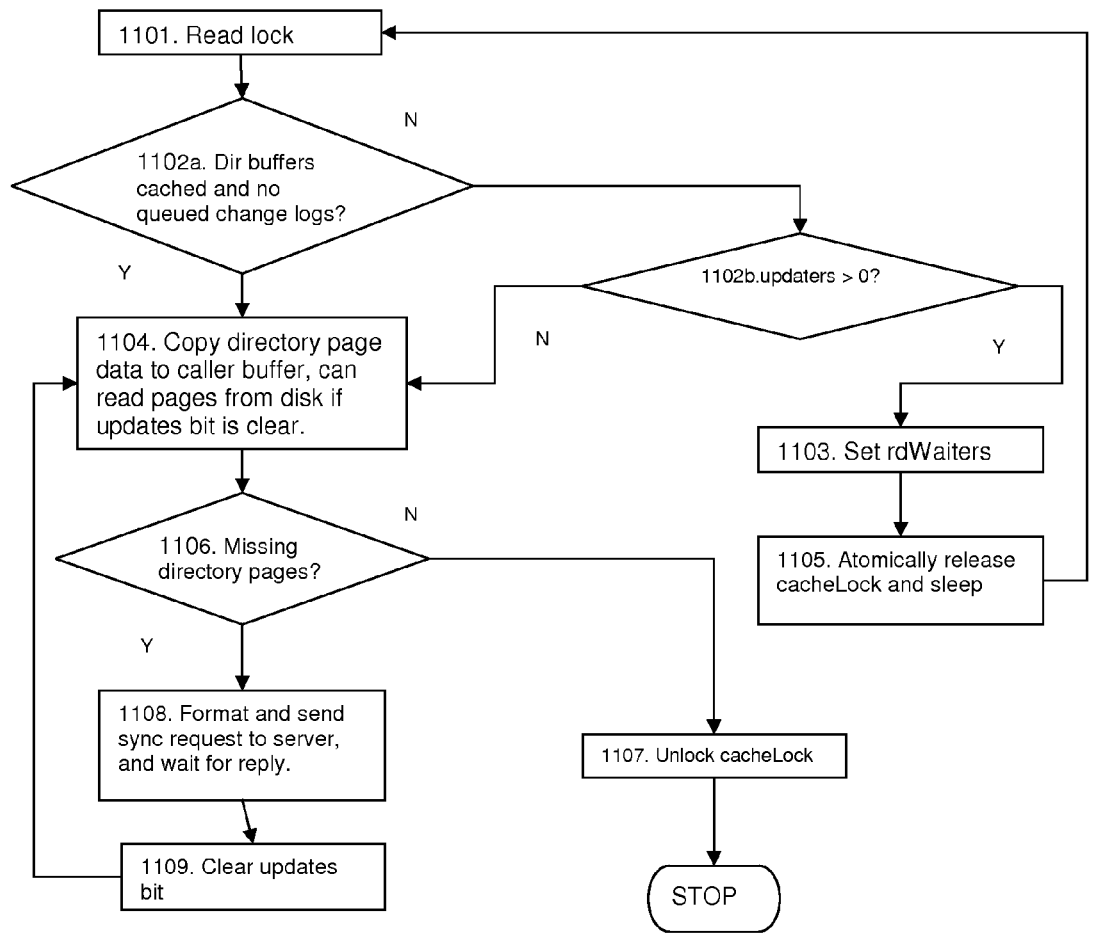
Figure 11: readdir logic for clients with direct disk access

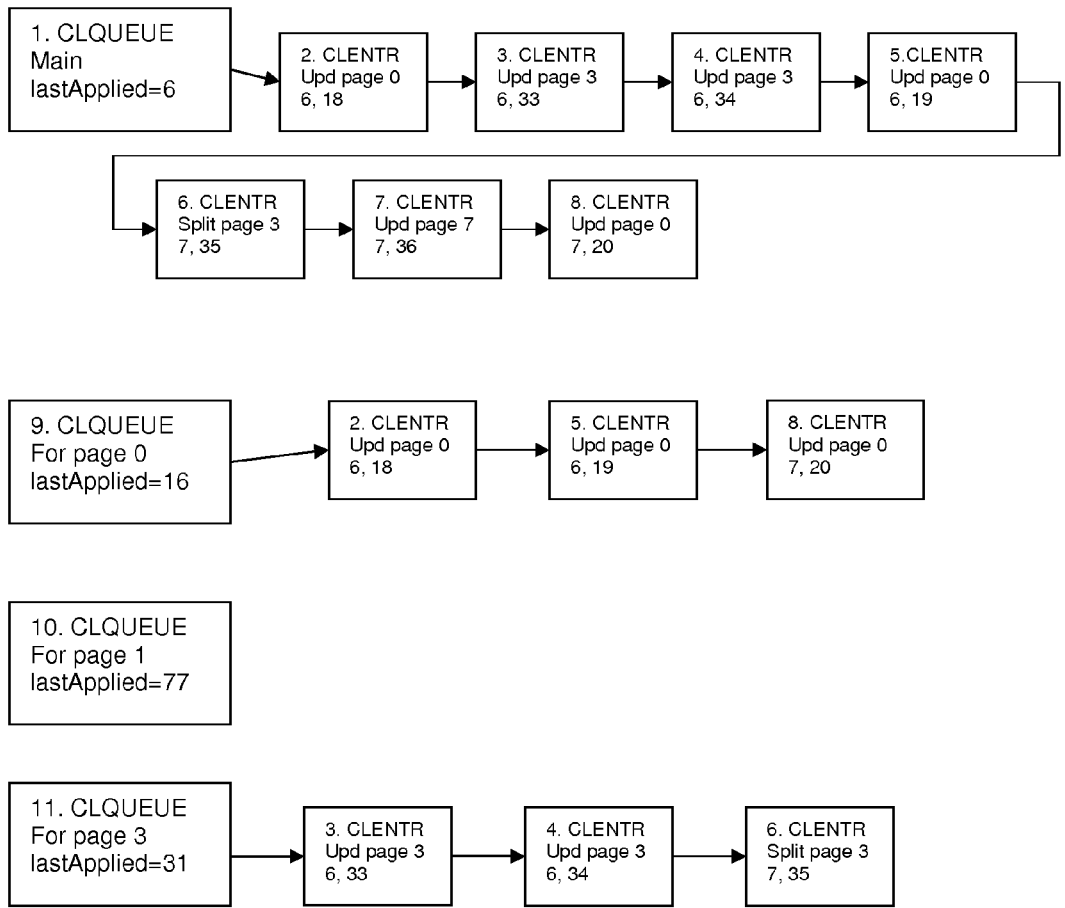
Figure 12: Example of multiple change log queues

METHOD, APPARATUS AND COMPUTER PROGRAM PRODUCT FOR MAINTAINING FILE SYSTEM CLIENT DIRECTORY CACHES WITH PARALLEL DIRECTORY WRITES

BACKGROUND OF THE INVENTION

1. Field of the Invention

This invention relates to the field of distributed file systems, where one or more client machines are communicating with a server machine of a particular file system over a communication network. Specifically, this invention deals with maintaining the consistency of a cached file system directory when one or more tasks on a client machine are updating the directory.

2. Description of the Related Art

As a preliminary to discussing the problem to which the present invention is directed, it will be useful to discuss some basic notions relating to operating systems, file systems in general and distributed file systems in particular.

Operating systems are the software components that perform basic system services for application programs running on a computer system. Among other things, operating systems manage the use by application programs of various system resources such as data files, executable program files, hardware resources such as processors and memory, and the like. An important subset of operating systems is that of UNIX-based operating systems, so called because they conform in varying degrees to a set of standards established by the original operating system of that name created at AT&T Bell Laboratories. UNIX-based operating systems include the Linux operating system as well as the IBM AIX operating system and the UNIX System Services component of the IBM z/OS operating system. UNIX-based operating systems are discussed in more detail in such publications as K. Christian, *The UNIX Operating System* (1988), and A. S. Tanenbaum, *Modern Operating Systems* (1992), especially at pages 265-314, both of which publications are incorporated herein by reference.

Operating systems use file systems to organize data and program files so that they may accessed by applications. File systems generally are discussed in the above-identified reference of Tanenbaum (1992) at pages 145-204; UNIX file systems in particular are discussed in the above-identified reference of Christian (1988) at pages 49-62, as well as in Tanenbaum at pages 287-290. Typically, such a file system takes the form of a hierarchical file system (HFS), in which files are logically contained in directories, each of which may be either a root directory or a subdirectory contained in a parent directory.

Distributed file systems, like file systems generally, are well known in the art. As defined in the *IBM Dictionary of Computing* (1994) at page 209, a distributed file system (DFS) is a file system "composed of files or directories that physically reside on more than one computer in a communication network". There are a number of commonly available distributed file system products known in the art. Some of these distributed file systems cache the contents of a file system directory and some do not. (Here the term "directory" means a directory of file names that is part of a standard UNIX file system tree.)

Most UNIX file system directories contain the names of all the subfiles and subdirectories in that directory. Each object in a UNIX file system is also identified by a number called an inode number and a unique generation number. (Because many UNIX file systems keep a table of objects, and the inode is an index into the table, the unique generation number is used to detect if a reference to a file is the current file described by the table slot or not) Thus a directory keeps a list of name/inode/unique triples for each object contained in that directory. However, in all of these cases (in distributed systems) where the client caches the contents of a directory, the client invalidates the cached directory contents if a user task on the same client machine makes an update such as the insertion of a name into the directory for the creation of a file. This results in the loss of the cached data, and a future read request to the directory has to send messages to the server to reestablish the cached contents of the directory on the client.

Some examples of prior-art distributed file systems include the following:

Server Message Block/Common Internet File System (SMB/CIFS)—This distributed file system does not cache directory contents, and all directory reads are sent to the server. Thus this protocol is much less efficient than protocols that keep cached directory data on client machines.

Distributed File Services/Distributed Computing Environment (DFS/DCE)—This distributed file system uses a token management scheme to allow clients to cache the contents of directories. However, any time a task on the client machine tries to update the directory contents (such as creating a file in the directory), the DFS/DCE client tosses the directory contents out of memory. This means that a future readdir( ) (read directory) operation needs to call the server.

The DFS/DCE client does have a name-to-inode lookup cache for directories. Basically for each directory, the client keeps a hash table of name-to-inode pairs, which allows the inode number to be determined during a lookup( ) operation. This hash table also keeps track of negative searches; thus, it would also remember if a particular name did not exist in the directory. This scheme still results in unnecessary messages being sent to the server when the DFS/DCE client removes the buffers that contain the contents of directories from its cache.

One of the most common file system functions is this lookup( ) operation, which is used to determine if a particular file name exists in a directory and to provide the address of the data structure that represents the sub-object (normally called a vnode) if the file name exists in the directory. Normally when creating a file, a lookup is first made to determine if the name exists (and normally the name would not exist since the user is attempting to create a new file with the given name) and then if it does not exist a create call is made to create the new file.

Distributed file system clients typically uncache the contents of directory pages when an update is requested to a directory by a user on the client machine. This results in increased server traffic due to the cache miss that results on the next lookup or readdir operation. More particularly, given the fact that any update to a directory (such as a create call) invalidates the directory contents, if a user is attempting to create more than one file, any lookup that occurs after the first create would have to be sent to the server, since the directory buffers are no longer in the cache and the name lookup cache would have no entry (yet) for the new name. Thus, given the fact that any update request immediately invalidates the client's cached buffers for the directory, any future readdir( ) and lookup( ) request for a name not in the lookup cache would require a call to the server. This could potentially more than double the number of calls to a server if the user was removing or creating many files at one time: one call for the create or remove, and one call for the intervening lookup.

The Network File System (NFS) version 4 client behaves very similar to DFS/DCE, except that it does not cache negative lookups, so it is slightly less advanced than DFS/DCE in this respect.

To summarize their shortcomings in this respect, if a user on a DFS/DCE or NFS file system client was creating 100 files, there would be at a minimum 200 calls to the server. More particularly, for each such file, there would be one call for a preceding lookup to check for file existence (which normally indicates the file does not exist yet), which would be sent to the server because the directory buffers were uncached, and one call for each create.

SUMMARY OF THE INVENTION

The present invention contemplates an improvement for the case where one or more tasks on the same client machine update a directory; it is used in conjunction with the prior-art methods of multi-machine consistency present in the file systems described above.

Presented is a method for allowing clients to keep their directories fully cached when an update is made; furthermore, it allows update and read requests to be sent in parallel to the server for the same directory to avoid waits over transmissions to the server.

The present invention maintains the directory contents cache for a directory that is being updated by a local user on the client machine after any update. This ensures that any future readdir( ) or lookup( ) request will normally be able to be processed without a server call.

One solution that would allow the directory to be maintained would be to lock the directory at the client, and send the update request to the server and then update the cached contents with the change and then unlock the directory. However, this would result in the client only being able to send at most one message to the server at a time for a particular directory. Thus if parallel tasks were writing to the directory at a client, they would be serialized over a network communication. This would be unacceptable, as it is desirable not only that the cached directories be maintained, but also that read and update operations to that directory can be sent in parallel to the server to reduce response times of directory operations.

The present invention allows parallel read and update operations by associating with the server copy of the directory an update version (maintained by an update counter) and using a change log queue for the cached version of the directory on the client machine to ensure directory updates are applied to the in-memory client buffers in the order they were processed at the server. Additionally the invention uses counters and flags for the cached directory version to track what is going on with readers and updaters. The invention thus allows messages to be sent in parallel to the server for a particular directory and also maintains the client cached directory contents. It also provides serialization mechanisms to ensure POSIX semantics are maintained.

Using the above example of creating 100 files, with the present invention no more than 100 messages would be sent to the server, one message per file create. No directory lookup or read messages would need to be sent to the server since the directory cache is maintained at the client. This results in a 50% reduction, at a minimum, in server message traffic in this particular example.

The present invention thus reduces messages sent to the server when processing directories on client machines, resulting in shorter response times and reduced usage of network resources. Furthermore, the present invention allows the caches to be maintained while not holding any locks on the directory over the server communications and hence allows for parallel message transmits to the server for the same directory.

The method and apparatus of the present invention are preferably implemented using one or more hardware machines in combination with computer software running on those machines. The software portion of such an implementation contains logic in the form of a computer-readable program for causing a computer (i.e., a hardware machine) to perform the method steps of the invention. The computer-readable program may be embodied as a computer program product stored on a tangible computer-usable medium comprising one or more volumes using semiconductor, magnetic, optical or other storage technology.

BRIEF DESCRIPTION OF THE SEVERAL VIEWS OF THE DRAWING(S

FIG. 3 shows an example of a directory change log that is returned from server to client on an update request.

FIG. 4 shows the logic of the file system server when updating the directory on behalf of a client.

FIG. 5 shows an example of a directory change log/buffer queue maintained at a file system client.

FIG. 6 shows the logic used by the client when performing a directory update request.

FIG. 7 shows the logic used by the client when performing a directory lookup( ) request.

FIG. 8 shows the logic used by the client when performing a directory readdir( ) request.

FIG. 9 shows an example of a directory change log that is returned from server to client on an update request for distributed file systems that have direct access to the disk.

FIG. 10 shows the lookup( ) logic used by a client machine that has direct disk read capability.

FIG. 11 shows the readdir( ) logic used by a client machine that has direct disk read capability.

FIG. 12 shows an example of multiple change log queues used with an extensible hash format directory.

DETAILED DESCRIPTION OF THE INVENTION

Figure 1:
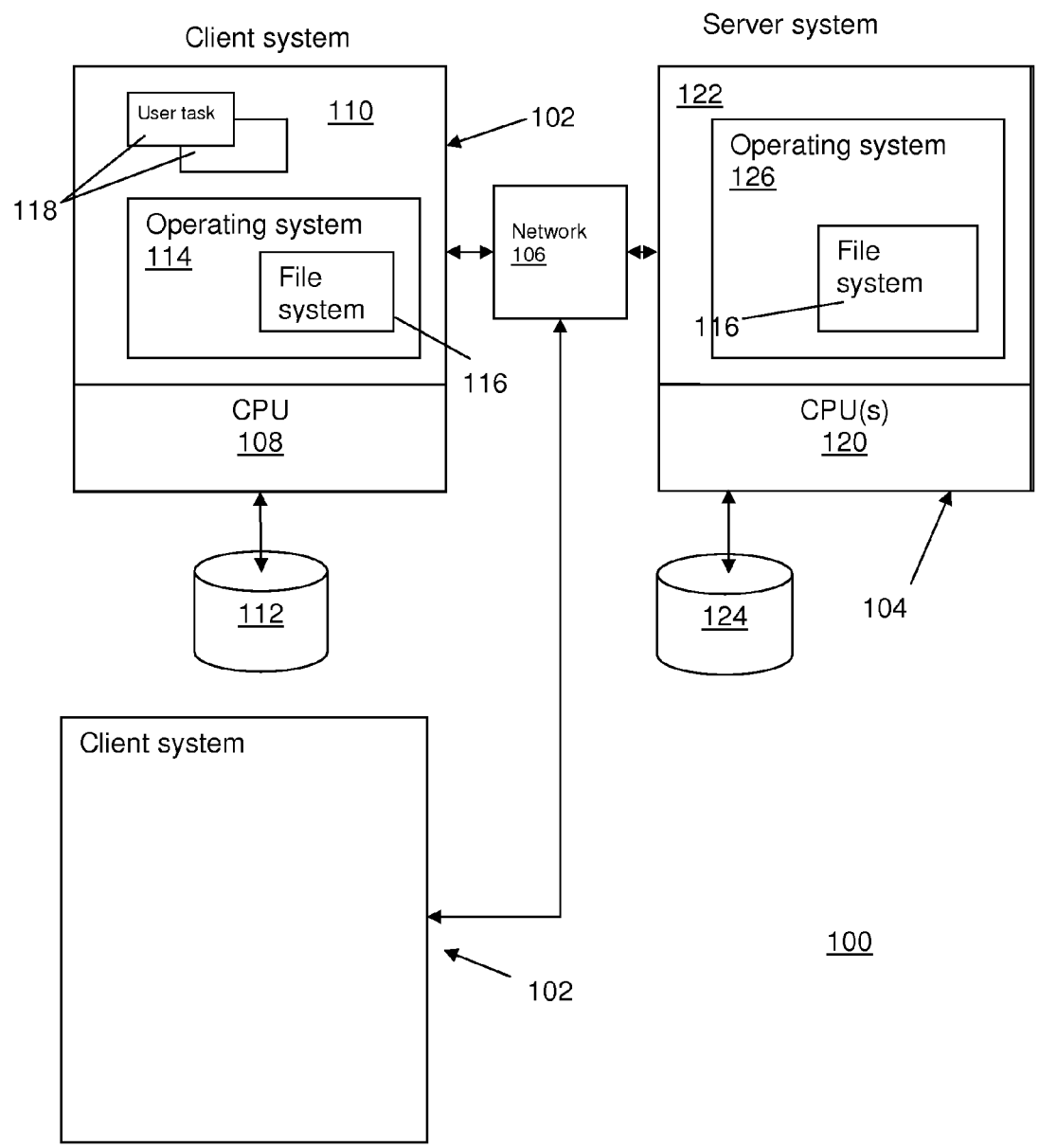
FIG. 1 shows a client-server system in which the present invention may be used.

FIG. 1 shows a client-server system 100 in which the present invention may be used. System 100 contains one or more clients 102 coupled to a server 104 over a network interconnection 106.

As shown for the upper client 102 in FIG. 1, each client may be a personal computer (PC) workstation containing at least one central processing unit (CPU) 108 and main memory 110, as well as nonvolatile disk storage 112. Loaded into main memory 110 from storage 112 and executing on CPU 108 are one or more programs, including an operating system (OS) 114, a file system 116 to be described in more detail below, and one or user programs 118 using services provided by the operating system 114 and file system 116. The present invention is not limited to any particular client architecture. However, an exemplary client 102 may contain an Intel-architecture processor 108 such as an Intel Pentium processor running a UNIX-based operating 114 system such as the Linux operating system.

Server 104 may comprise either a separate physical machine from other servers, a separate logical partition of a logically partitioned machine, or a guest machine running on a virtualization layer of an underlying physical machine. In a manner similar to that of clients 102, server 104 contains at least one CPU 120 and main memory 122, as well as non-volatile disk storage 124. Loaded into main memory 122 from storage 124 and executing on CPU 120 are one or more programs, including an operating system (OS) 126 and a file system 128 to be described in more detail below. Just as the present invention is not limited to any particular client architecture, it is also not limited to any particular server architecture. However, an exemplary server 104 comprises an IBM System z server having a version of the IBM z/OS operating system running on a z/Architecture processor. The file system 128 preferably comprises the IBM z/OS zSeries File System (zFS). Except for aspects relating to the present invention, zFS is described more fully in the IBM publication *z/OS Distributed File Service zSeries File System z/OS V1R7 Implementation*, SG24-6580-02 (January 2006), incorporated herein by reference.

Figure 2:
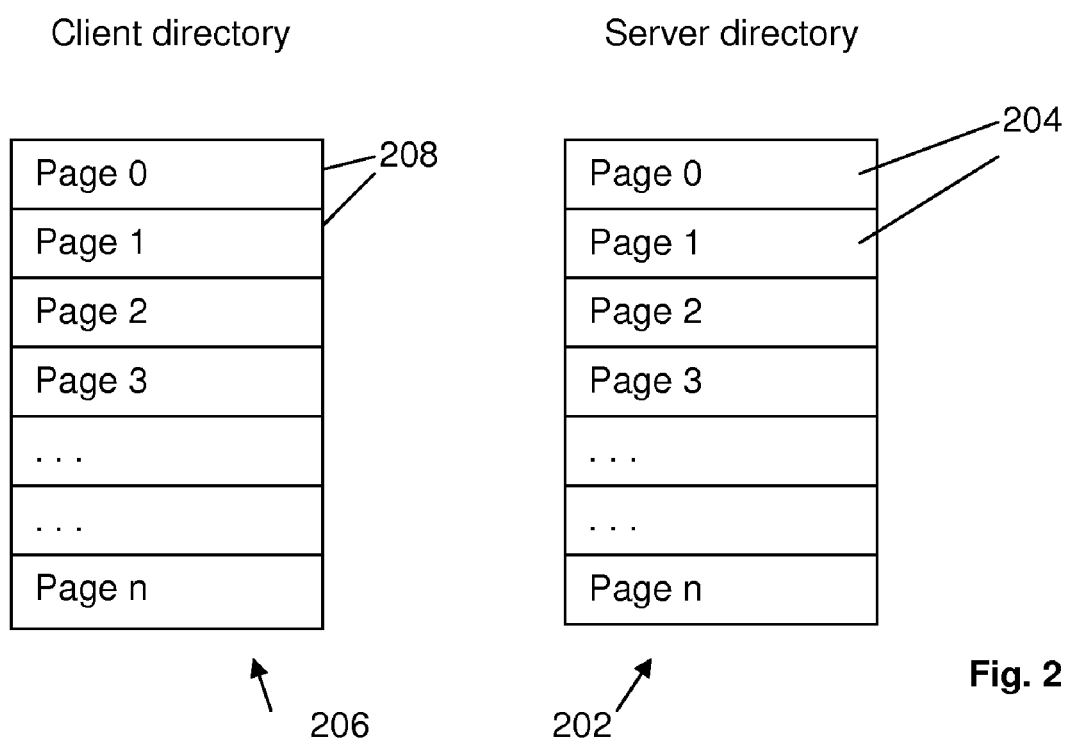
FIG. 2 shows a typical file system directory structure.

Turning now to the operation of the present invention, the main issue with allowing parallel reads and writes to a directory from a remote client 102 is that the client must know the order in which the operations were processed at the server 104. zFS currently uses a flat directory scheme where the directory is simply an array of 8K (8192-byte) pages, each page containing one or more names of files or subdirectories contained in that directory. Thus, referring to FIG. 2, server 102 maintains a file system directory 202 comprising an array of pages 204, while, similarly, client 104 maintains a file system directory 206 constituting a cached version of the server directory and comprising a similar array of pages 208.

Each page contains a hash table for fast lookup of the name within the page. Note that updates are not independent of each other. For example, a remove of a file frees the space used for a name in a directory page, so that a subsequent create of a file may reuse that space in the same directory page for the new name. Thus the order in which updates are made to a directory is important to communicate to the client 102 so it knows how to keep its buffers in sync with the server 104 and to properly apply updates.

To facilitate this, a data version is used that is stored in the status portion of the inode for the directory. The status portion of an inode keeps information about a file or directory such as the POSIX attributes mtime (modify time), ctime (change time), file size and so on. Each time an update is made to the directory, the data version is incremented. Note that by POSIX rules, each update to a directory requires an update to the mtime and ctime. Thus any directory update already requires an update to the status for the directory, so updating a data version in addition to mtime and ctime results in very minimal overhead. It is important to note that this data version is stored in the disk inode for the directory; it is not cached in memory at the server 104 since the structures for the directory could be uncached between client calls, losing the last data version.

Furthermore, the server 104 keeps a log of the changes it makes to the directory buffers and sends this log back to the client 102 on the reply to the update request. The client 102 uses this log to apply changes to its cached directory buffers, thus keeping its buffers in sync with the server 104.

Finally, the server 104 always returns the status of a directory on every reply to a directory update or read request made by a client 102, so a client can always examine the data version of the directory page returned on a read request. The change log is a sequence of records that describe changes made to the directory. A record could specify that a directory page is to be deleted, a directory page is to be added to the directory or it could specify an offset into an existing directory page and the new bytes to be stored at that location in the page. Every reply packet has a header that indicates how many records are in the change log and the offset in the reply packet of the start of the change log.

FIG. 3 shows a directory change log.

Referring to FIG. 3, the rectangle on the left shows a sample reply packet 302. Each reply packet 302 for a server call has a common header 304. A count field of the header 304 indicates how many records are in the directory change log, and an offset field indicates the offset in bytes of the beginning of a change log 306 in the packet. Change log 306 is an array of variable-length records 308.

A sample embodiment of a change log record 308 in the C programming language is shown in the right of FIG. 3. The len field is the length of the record 308 (needed since the records are variable in length), and the page field is the logical directory page number being affected by the update. The change could be adding a new directory page or deleting a directory page. If the record 308 specifies an update is to be made, then the offset and dlen fields specify the offset in bytes from the beginning of the specified directory page and length of bytes to change at that offset. The data field contains zero bytes if the record 308 is a DELPAGE (delete page) or NEWPAGE (new page) type, and contains dlen bytes of new data to store at the specified offset into the page if the record 308 is an UPDPAGE (update page) type. In the UPDPAGE case, data consists of the actual bytes to store at the location in the page.

It should be noted that one could use a logical description of the change (such as add name to page X) instead of, or in addition to, specifying the exact bytes in the page to change. A client 102 would take the logical description and apply the same algorithms that the server 104 does for updating the page, guaranteeing that the client's version of the directory page matches the server's. The specific implementation of the invention described herein uses a mixture of both methods.

FIG. 4 shows the logic for a file system server directory update.

The server 104 first obtains storage to hold a change log (step 401). Note that any directory operation normally results in a simple addition or removal of a name, the exception being the rename operation, which could result in an add/remove/update for two directories (a source and a target directory); so the change log does not need to be very big, even for the largest possible directory update. The server 104 then obtains a write lock on the directory (step 402) before updating it (step 403). The directory is updated as is done normally by the file system, except that any change is also recorded in the output change log. The server 104 then increments the data version (step 404) and stores the incremented version in the status portion of the directory inode along with updated mtime and ctime. Note that at some time later the inode contents are written to disk. The server 104 then unlocks the directory (step 406) and includes the change log in the change log field 306 of the reply packet 302 (FIG. 3) sent back to the client 102 (step 407).

Clients 102 send update requests to server 104 in parallel (without holding a lock over the transmission and wait for a reply). A client 102 could send updates U1 and U2 to the server 104, but the server 104 may process U2 before U1. Also, the replies could be received out of order by the client 102. Although the server 104 processed update request U2 before request U1, the client 102 could actually see the reply for U1 before it sees the reply for U2. The client 102 needs to apply directory updates in order, so it uses a queue, with a lock to protect the queue, and remembers the last version applied to the in-memory directory buffers. If a reply for a subsequent update is received before a reply for a preceding update, it is queued.

Clients 102 keep directory pages in memory (or they could store them on a local disk drive). Since cache space is finite, many clients 102, including zFS clients, use a least recently used (LRU) scheme when the cache is full and a new page needs to be cached. Hence any given directory might have all, some, or none of its pages in the cache. There are two types of calls in POSIX file systems that read directories: lookup( ) and readdir( ). The lookup( ) operation is used to search a directory for a given name and return the inode/unique identifier ("uniquifier") pair for the file. The readdir( ) operation is used to get the list of name/inode/uniquifier triples for some or all of the names contained in a directory. Thus a directory read operation may need to call the server 104 if the corresponding directory page (or pages) is not cached; in this case it would be desirable to have the server 104 return the page contents in the reply packet to the client 102 and the client could then save that page in its cache and avoid a future call to the server 104. It is also desirable to not make the task performing the directory read operation wait for any in-progress updates for that directory whenever possible. Hence, it's desirable to send directory read requests to the server 104 in parallel, whenever possible, at the same time directory update requests are being made to the server 104. For this reason the server 104 always sends the data version of the directory, at the time the read was made at the server 104, for any directory read requests. The client 102 can use this information to know if it's safe to cache the directory buffer it receives in the reply from the server 104.

There are three possible cases for the client 102 to consider when a directory buffer has been returned to the client from the server 104 on a directory read.

First, the data version in the reply packet 302 for the read request can match the last applied version in the change log queue. This is the easy case; the directory page can be safely cached in the client memory cache.

Second, the data version in the reply packet 302 can be smaller than the last applied version in the change log queue; in this case the buffer cannot be cached since the version of the directory cached is later than when the buffer was obtained. This should be rare since replies are usually received in the order the server 104 processes the requests, but logic is required of course to handle the case when they are not.

Third, the data version in the reply packet can be larger than the last applied version in the change log queue. In this case the directory buffer itself can be queued in the appropriate position in the change log queue and cached when the preceding update replies arrive and the change log queue is processed.

In this way, the directory pages kept in the client's cache are always at some consistent version. One would not have page 0 at version X and page 1 of the same directory at version Y, for example.

FIG. 5 shows a client change log queue 500 for a specific directory. Change log queue contains a header (CLQUEUE) 502 and one or more entries (CLENTRY) 504. Header 502 contains the following fields of interest to the present invention.

A lastAppliedVersion field indicates the current version of the cached pages of the corresponding directory. In a preferred embodiment, this structure may be contained in the structure that represents a file system object, the zFS vnode.

A cacheLock field is used to serialize updates to the queue 500 and other processing related to the directory operation that is outside the scope of the present invention, such as caching security information and making security checks. This lock is never held over a transmission to the server 104.

A queuedLogs field anchors a list of queue entries (CLENTRY) 504, which are queued change logs or directory buffers.

A readers field and an updaters field are used to serialize the case where a multi-page readdir( ) request has to call the server 104 because the associated directory pages are not in the cache. Since the readdir( ) request is fairly infrequent in most customer workloads (compared to lookup( ), which is often the most frequent operation), a readdir( ) request that encounters a cache miss or determines there are queued change logs will simply wait for in-progress update replies to return from the server 104. It will then prevent future updates from occurring (by incrementing the readers count) until it can get a consistent snapshot of the missing directory pages.

A countsLock field is used to serialize the updates to the counts if the main cacheLock is held only in read mode, which is the case for lookup( ) and readdir( ) since they normally are only reading buffers as long as they are in the directory cache. The rdWaiters and updWaiters fields are used to serialize the case when a readdir( ) operation that had a cache miss is waiting for in-progress updates. These are used in sleep and wakeup operations, which are essentially equivalent to the POSIX pthread mutex and condition variable locking mechanisms.

A change log queue entry (CLENTRY) 504 describes either a queued change log for an update to the directory or a queued directory buffer whose data version is greater than the current version of the cached directory buffers. Each queue entry 504 contains the following fields:

The dataVersionNumber is the data version the server 104 returned on the corresponding update or read call. The entries are kept in sorted order, with change logs preceding a cached directory buffer with the same version.

The next field is simply a pointer to the next entry 504 in the queue 500.

The type field indicates whether the entry represents a queued change log 506 (type=CL) or directory buffer 508 (type=BF). If the entry type is CL, then the dlen and numents indicate the length of the change log 506 and number of records in the change log. If the entry type is BF then dlen is set to the size of a directory page (which is 8K for zFS) and numents is undefined. In the example shown in FIG. 5, the first and third entries 504 in the queue 500 are for change logs 506, while the second entry 504 is for a directory page 508.

The clptr points to the corresponding change log 506 (type=CL) or directory buffer 508 (type=BF).

The descriptor is a logical description of the change, such as "Create file, name=xxxx, inode=y, uniquifier=z" that describes what the change log represents. This is used by lookup( ) to ensure it provides correct POSIX semantics, and its use is described in more detail below.

FIG. 6 shows the steps performed by the client-side file system when a task performs a directory update operation (such as a file create, rename a file, create a subdirectory) on the client machine 102. The flowchart of FIG. 6 shows only the logic relative to this invention in a directory update operation.

In step 601 the cache lock (cacheLock) is obtained in write mode. Then a check is made in step 602 to see if there are readdir( ) waiters (rdWaiters>0) or server directory readdir( ) operations in progress (readers>0). If there are, then updWaiters is set (step 603) and the task atomically releases the cache lock and sleeps (step 604). In this case we have a readdir( ) that had a cache miss in progress, we let the readdir( ) complete so it has a consistent snapshot of the directory buffers. Note that since readdir( ) is much less frequent than lookup( ), and since the system of this invention keeps the directory buffers cached when possible, it should be rare that a readdir( ) has a cache miss for most workloads. (The exception is when multiple systems are updating the same directory, but that is a phenomenon that can occur with or without this invention.) If there are no in-progress readdir( ) operations, then the updaters field is incremented (step 605) and the cache lock is released (step 606). The main idea here is that the cache lock is not held over the transmission to the server 104. This allows other update or lookup( ) operations to this same directory to transmit to the server 104 immediately; no locks prevent the transmission, allowing for parallelism.

After a reply is received from the server 104 (step 607), the cache lock is reobtained in write mode (step 608). If the operation was successful, the dataVersion that was returned in the reply packet is compared with the lastAppliedVersion in the CLQUEUE (step 609). If dataVersion is equal to lastAppliedVersion+1, then this change log can be immediately applied to the directory cache buffers (step 610). Applying the change log means processing each record in the log, and creating, deleting or updating pages as dictated by each record. Note that some pages may not exist in the cache, and the update is therefore not made (the pages have to be fetched from the server 104 on a future lookup( ) or readdir( )). If dataVersion is not the same as the lastAppliedVersion+1, then it is queued, in order, in the change log queue (step 617), updaters is decremented (step 618), and the cache lock is released (step 619), since the operation has completed as it relates to this invention.

Continuing after step 610, after the change log is applied, the lastAppliedVersion is incremented (step 611). Once this change log is applied, a check is made to determine if the next change log in the queue is ready to be processed (step 612). It is ready to be processed if the CLENTRY describes a queued change log (type=CL) and the dataVersion is equal to lastAppliedVersion+1, or the CLENTRY describes a pending cache of a directory page (type=BF) and the dataVersion is equal to lastAppliedVersion. If it is ready to be processed (step 613), the CLENTRY is removed from the queue, the change log is processed (type=CL), or the buffer is cached (type=BF) in the cache of directory pages. The lastAppliedVersion is set to the dataVersion in the CLENTRY. This is repeated until no more CLENTRYs meet the criteria for processing. Once there are no more CLENTRYs available for processing, the updaters field is decremented (step 614) and a check is made to see if there are readdir( ) waiters and this was the last updater to the directory (step 615). If true, (step 616), the readdir( ) waiters are woken up. Finally, the cacheLock is released.

FIG. 7 shows the logic used by a client machine 102 for a directory lookup operation. The lookup( ) function takes as input a name; it returns a data structure that represents the subfile or subdirectory if the name exists in the directory and returns the POSIX return code ENOENT if the name does not exist. The algorithm of FIG. 7 shows the parts relevant to the invention (the directory searching and caching).

The cache lock (cacheLock) is obtained in read mode to allow for parallel tasks to perform lookups on the directory buffers (step 701). If there are queued change logs 506 (step 702), the change log queue 500 is examined to determine if there is a queue entry (CLENTRY) 504 with a descriptor that indicates the addition or removal of a name matching the input name (step 703). This is important; for example, a user could be confused if they created a new file and later looked it up and was told it did not exist. Any entry 504 in the change log queue 500 represents a prior completed create, remove, or rename of some object in the directory, so it is important that future lookups check this queue to ensure correct POSIX semantics. If the name is found (step 704), the cache lock (cacheLock) is released (step 706). If the name is not found in a queued change log entry, the cached directory buffers are searched (step 705). If there are missing pages from the directory cache, then it may be the case that it is unknown whether a specific name exists in the directory, in this case the server 104 must be called.

Step 707 checks to see if the change log or the directory buffers provide a definitive answer for whether the name exists in the directory or not. If the caches provide a definitive answer, processing related to the invention ends. If there were missing pages in the directory cache, and an answer could not be provided, a lookup( ) message is formatted and sent to the server 104 (step 708). In a preferred embodiment of the invention, the lookup( ) request to the server 104 asks the server 104 to send the page that contains the name (if the name exists in the directory) or a missing page of the directory so the client 102 can optimize the lookup of the name at the server 104 with the filling of missing pages of the directory. One skilled in the art could expand upon this to return more directory pages, or less, or provide a separate server function whose sole purpose is to obtain directory pages, but the filling of missing pages with the lookup of the name is felt to be the most optimal method of ensuring missing pages of an active directory are cached at the client machines.

Once a reply from the server 104 is received, the cacheLock is obtained in write mode (step 709) to allow for a search/modification of the change log queue and caching of any directory pages passed in the server reply. If the server 104 did not provide any directory buffers (step 710), then the cacheLock is released and processing related to the invention ends. If the server 104 did provide one or more directory pages, the lastAppliedVersion in the CLQUEUE is compared to the data version the server 104 specified in the reply packet (step 711). If the versions are equal, the directory pages are simply cached in the client machines cache (step 712). If the server reply packet data version is greater than the lastAppliedVersion (step 713), then the buffer is added to the change log queue (step 715). If the server reply packet data version is less than the lastAppliedVersion, the directory page cannot be cached. Finally, the cacheLock is released (step 714).

FIG. 8 shows the logic related to this invention used for the readdir( ) function. The readdir( ) operation is designed to take an offset into the directory (a starting point, which could be the beginning of the directory or some other point in the directory) and a user buffer, and the user's buffer is filled in with names until the buffer is filled or the end of directory is reached.

The readdir( ) operation first locks the cacheLock in read mode (step 801). Note that the most common case, especially since the invention is used to try to keep the directory pages cached as much as possible, is that the relevant directory pages will be in memory and the operation can simply be satisfied from the cache. Thus a read lock is desirable because it allows parallel lookups and readdirs on the directory at the same time. If the operation can be satisfied from the cache (steps 802 and 803), which means the data resides in the cache and there are no queued change logs (since we had returned successful directory update operations to users and those changes are not yet in the directory buffers), the data (names/inodes/uniquifiers) from the cached directory pages is copied, in a format recognizable to the local operating system, to the user's buffer. The lock would then be released (step 804) and the operation is complete.

If the directory data was missing in the cache, a check is made to determine if updaters>0 (step 805). If it is, that means that there are in-progress directory updates, and since we want a consistent snapshot of the directory when copying the names to the user's buffer, we set the rdWaiters flag (step 806), and atomically release the lock and sleep (step 807) waiting for the in-progress updates to complete. This is the only instance when a task is made to wait on a prior transmission for the same directory, and it should be a rare case indeed. Once woken, the lock is reobtained (step 808) and processing continues where it left off. Note that since the task slept, it could be the case that the directory buffers are now cached, thus a slight, but not strictly necessary, improvement to the algorithm would be to recheck the directory cache to determine if desired pages are now cached.

If there are no in-progress directory updates, then readers is incremented (step 809). This is done by obtaining the countsLock in write mode, incrementing the count, and then releasing the countsLock to ensure the count is safely updated. This is required since the cacheLock is only held in read mode. The cacheLock is then released (step 810) and a readdir( ) request packet is sent to the server 104 indicating which page the client 102 is missing from its cache (step 811). Once the reply is received from the server 104, the cacheLock is obtained in write mode (step 812) so the returned data for the page can be cached (step 813). Note that if the user task provides a large buffer they could require access to many directory pages, and hence a loop is provided to allow as many names to be stored in the output caller buffer as possible (step 814). Once the user's buffer is filled with the names, the readers count is decremented (step 815) and a check is made to determine if the readers count is zero and there are any update requests to the directory waiting (step 816). If true, the updWaiters bit is cleared and any waiting update tasks are woken up (step 817). Finally, the cacheLock is released (step 818).

Thus the above invention provides proper POSIX semantics while maintaining the cached directory buffers at the clients 102 when one or more user tasks on the client 102 machine are updating the directory. Furthermore, locks on the directory are almost never held over a transmission of an update request or directory read request allowing multiple requests to be sent in parallel from the client 102 to the server 104 for the same directory. The above invention provides for all of this with minimal additional overhead. The performance gain is nontrivial when users are updating directories at client machines. This is especially important if the directory is large since uncaching a directory requires reading that directory from the server 104 on future lookup( ) and readdir( ) requests.

Applying the Invention to More Complicated Directory Organizations and Distributed File System Environments The above implementation of the invention was applied to a directory that was organized as a flat file of names. Basically the directory was one or more pages where each page contained zero or more names of subfiles in the directory. This type of organization can lead to slow lookup times if the directory is large since each page has to be examined until the name is found, or the end of the directory is reached. The invention itself is not limited to this simple scheme; this fact will be illustrated through the following examples.

B+ Trees

A B+ tree is well known in the art, it's basically a balanced sort tree where the leaf nodes of the tree contain pointers to the actual data elements in the tree. The tree allows for fast search of a name since the indexes in the tree remain balanced and lookup time is a logarithmic function of the number of data elements in a tree. Many file systems use B+ trees, and a typical organization is to keep the names in a flat file, which can be sparse, and keep the index pages of the directory in a separate file. Basically the status portion of the inode of a directory would point to another inode which maintained the index pages for the directory. Each node in the tree would occupy exactly one disk block. Each node has a variable number of pointers and key values, from N to 2N where N is some predetermined number based on the size of a disk block. For interior nodes, the pointers will point to lower level nodes in the tree and the keys will be the largest value in the subtree referenced by the corresponding pointer. For leaf nodes, the pointers will point to corresponding pages and offsets into those pages of the corresponding entry.

Essentially, whenever an attempt to add a new item to a leaf node is made where the leaf node already contains 2N in-use items, the leaf node must be split, this could cause further splits up the tree to keep the tree balanced. Conversely, if the removal of an item from a leaf node causes the number of in-use items to fall below N items leaf nodes might be merged, causing further merges up the tree.

Since the index nodes of the tree are kept in a separate inode, the nodes of the index tree can be referred to by a logical page number, much in the same way pages of a directory are also referred to as a logical page number.

Applying the invention to a B+ tree is fairly straightforward. The change log of any update would not only describe changes to the data pages, but also record changes to the index pages (interior nodes) of the associated tree. Two new change log records would be added:

NODE_SPLIT—Used to indicate a node should be split, the lower value N keys remain in the current page, and the new page would contain the higher N keys. The NODE_SPLIT record would indicate both the original page of the node, and the new page for the split. (Essentially this is the creation of a new page in the index tree.)

NODE_MERGE—Used to indicate a node merge, it would indicate both of the original two pages that are to be merged into one. (Essentially this is the removal of a page from the index tree.)

The application of change logs and queuing of change logs would be similar to the algorithm presented in FIG. 6.

The lookup( ) routine would not only request that the server 104 return the missing data page that contained the name, but possibly also return one or more interior index nodes so the client 102 could "fill in" missing portions of the tree. The caching of these pages would follow the same algorithm described in FIG. 7.

The client 102 might want to know about empty pages in the data pages for the directory. One way is to use a bit mask that is initially set to 1's, and as the client 102 determines a page does not exist (by calling the server 104) it can clear the associated bit corresponding to the page number. On a readdir( ) request, if the client 102 attempts to read page that is not allocated to the directory, the server 104 could indicate this in the reply and return the next allocated page to avoid future reads of unallocated pages by clients 102.

Thus one skilled in the art can apply the invention to a directory stored as a B+ tree.

Direct Disk Access

The basic distributed file system is one where there are one or more servers, to one or more clients 102, where the clients do not have direct access to the disk drives that store the file system contents. This is true of NFS version 4, DFS/DCE, and the zFS product as described above. However, there are some distributed file systems where the clients 102 have direct read or write capability to the disk drives that contain the file system data. In many of these cases, there is still a server 104 for a specific file system object, such as a directory as described in this document. However, client systems may directly read directory contents from disk. Thus, zFS may be enhanced to run in an environment where the client machines have direct disk access.

In this case, a client machine will directly read the directory contents from disk, after first ensuring it has proper distributed serialization from the server 104 (which is normally done through a distributed locking mechanism or token scheme). Once it has a guarantee from the server 104 it can read and cache directory contents directly from disk. If it has to make an update to the directory, it sends the update request to the server 104 and it sets an update bit to indicate it has made updates to the server 104. If it has made updates to the server 104, and it finds that a particular directory page is not in the cache, it sends a "sync" request to the server 104 to write and sync the directory contents to disk so it can directly read the directory contents from disk. This eliminates the need to read directory pages using the readdir( ) and lookup( ) requests sent to servers, they can now be directly read from disk. This can reduce the number of packets sent to servers, and significantly reduce the number of bytes transmitted on the communication channels as the directory page contents no longer flow over the wire.

However, due to the fact that directory updates are often intermixed with lookup requests on the same directory, it's important for the directory pages to remain cached after the client 102 sends a directory update request to the server 104. Without maintenance of the directory caches, as described by this invention, each time an update was made to the directory; the directory pages would be uncached. This means that future lookups or readdir( ) request on the client machine may need to send a "sync" request to the server 104 to write and sync the directory contents so the client 102 can then reread the directory contents from disk. This would create extra server messages (for the sync), and extra disk IO for both the server 104 and the client 102.

Thus, using the invention to update the cached client directory buffers after an update completes after the server 104, is essential to good performance for any distributed file system where directory updates are sent to servers and directory contents are cached at client machines.

In most file systems, any given object (such as a directory) is conceptually an array of logical blocks, numbered 0, 1, 2 . . . to N−1. These logical blocks are mapped to their physical locations on disk via an indirect block tree which is anchored in the inode of the object. For example, zFS lists the location of the first 8 logical blocks in its inode for the directory, and it has 3 indirect block trees used to locate blocks higher than 8. For example, there is an indirect level-1 tree that has a block that is one large array that directly locates blocks numbered 8 through 2047. For blocks higher than 2047, a level-2 tree is used whose top level block has an array that points to lower level indirect blocks which in turn point to the actual locations of the corresponding logical pages of the object. Thus the level-2 tree is used to locate the physical location of blocks numbered 2048 through 4,163,647. Blocks numbered higher than 4,163,647 would use the level-3 tree and so on. Thus the location and existence of a logical block is determined by reading the portion of the indirect block tree that would locate it.

For a client 102 that does direct disk reads, it needs to read and cache indirect blocks from disk to locate the physical locations of the directory pages so it can directly read them from disk. Thus an enhancement to the change log scheme used by the invention is to also provide an indication of the updates made to indirect blocks when creating or deleting pages of the directory.

Finally, there are many file systems, and zFS is one of them, where one or more snapshots can be made of a file system. In this case the read-only backup copy of an object (such as a directory) contains pointers to the directory at the time of the snapshot, and the writable version of the directory becomes copy-on-write (COW). A COW object means that any first time update made to a particular page of the object, or indirect block of the object must allocate a new block to contain the contents of the page or indirect block, copy the original contents from the backup of that page to the newly allocated block, and then update the new block. This ensures the backup version remains as it was at the time of the backup. The convention that zFS uses to indicate a page or indirect block is COW is to set the high-order bit in the page pointer in the inode or indirect block.

The enhancements to the invention for the direct disk access case are as follows (refer also to FIG. 9):

1. More detail in a change log record to show the indirect block updates required when allocating a new page or deleting a page from the directory. It also provides both the logical and physical pages of any specified page. This is useful since the client 102 reads the direct physical pages from disk and usually refers to the page by its physical block number on disk rather than its relative page in the directory.
2. A new change log record called COWPAGE which indicates a new page was allocated from a copy-on-write page so the client machine can perform the copying from the old page to the new page.
3. An updates bit added to the CLQUEUE structure to indicate an update has been sent to the server 104 since the last sync operation, or since the client 102 first established a distributed lock on the directory.
4. An updated readdir( ) and lookup( ) routine to handle direct reads from disk, as shown in FIG. 9.
5. COWPAGE—new flags bit, indicates one or more new pages had to be allocated due to the directory being copy-on-write (FIG. 9).
6. physPage—Indicates physical location of directory page in the file system (FIG. 9).
7. ibs—Physical location of zero or more (maximum of three for zFS), indirect blocks that map the logical to physical page of the directory page (FIG. 9).
8. cowPage—The original physical page number of directory page, indicates source page for a newly allocate page because original page was copy-on-write (FIG. 9).
9. Indexes—Index into corresponding (one for one) indirect block listed in ibs of slot that points to lower level indirect block or physical page location (FIG. 9).
10. cowIbs—The original physical page number of indirect blocks that were found to be copy-on-write when the update was made.

Update requests follow almost the same exact algorithm as the updates logic shown in FIG. 6. Specifically, step 5 (605 in FIG. 6) would be changed to set the updates bit in the CLQUEUE in addition to incrementing the updaters field. Steps 10 and 13 (610 and 613 in FIG. 6), which apply the change log, would also be changed to update the indirect blocks and handle copy-on-write cases. Specifically, if there are newly allocated indirect blocks as indicated by the change log (NEWPAGE, DELPAGE or COWPAGE cases); they would be created in the cache. If those indirect block are copy-on-write versions of their original backing blocks, the original backing blocks would be read from disk (safe because the backup blocks cannot change) and copied to the new blocks. If the new indirect blocks were created from backup indirect blocks, the new indirect blocks would be updated to set the high-order bit in all array slots since the blocks that the indirect block locates are all cow. The specific pointers in each indirect block are also updated to point to the new data page or new lower-level indirect block. Similarly to the indirect blocks, a new page or copy-on-write directory page would be created in the cache. If the directory page was COW, the backing page is read and copied to the new page. Finally, the new or existing directory page is updated with the changes described by the dlen, offset, and data fields of the change log.

The new logic used for directory lookup for a client 102 with direct disk access is shown in FIG. 10.

Steps 1001 through 1004 follow the exact same logic as steps 701-704 in FIG. 7. With step 1005, if the updates bit is clear, the client 102 can not only use its cached directory and indirect block pages in memory, but can safely read any missing blocks from the cache from disk. If the updates bit is not clear then only the in-memory buffers can be used. Thus if the updates bit was not clear, and there were missing pages, it could be the case that the lookup was not satisfied from the cache (step 1006). If the lookup was satisfied from the change log queue or from the cache then the cacheLock is simply released (step 1007). If not, and the updaters count is nonzero (step 1008), the rdWaiters bit is set (step 1009) and the lock is atomically released and the task waits until the updaters count is zero (step 1010), then the process of the lookup would start over again at step 1001. If the updaters count is zero, then a sync request is sent to the server 104 to sync any dirty pages (if any) to disk for the directory (step 1011). The updates bit is then cleared and control is returned to step 1005, which is now guaranteed to be successful since the updates bit is clear.

FIG. 11 shows the readdir( ) logic for clients 102 with direct disk access.

The readdir( ) code runs with a read lock for the cacheLock (step 1101). A check is then made to see if the directory buffers are fully cached for the region of the directory being read and if there are any queued change logs (step 1102a). If there are uncached directory buffers or there are queued change logs, then a check is made to see if there are directory updaters (step 1102b). If there are directory updaters, the rdWaiters bit is set (step 1103) and the task atomically releases the lock and sleep (step 1105). Processing would then resume back at step 1101 when the task wakes up (when there are no more in-progress directory updates). If the test in step 1102b was false, then processing resumes at step 1104 which will copy as much data as it can to the callers buffer. Similarly if step 1102a is true, then it's also safe to attempt to read the directory pages from the cache. Step 1104 will copy the directory data from the cache to the caller's buffer; if the updates bit is clear, the code can read directory pages from disk, if not then a sync request will be required. (As a possible optimization, to reduce the number of sync calls that are sent to the server, one could keep track of the directory pages and indirect blocks that were recently updated. If not reading an updated block, it can be read directly; if reading an updated block, then a sync request is sent to the server.) If step 1104 found that it needs to read data from disk and the updates bit was on (step 1106), then a sync request is sent to the server 104 (step 1108) to sync the data for the directory and the updates bit is cleared (step 1109). Processing would resume again at step 1104 which is guaranteed successful since the updates bit is clear. Once the directory data is copied to the caller's buffer, the cacheLock is released (step 1107).

The above algorithms show that the invention can be applied to the case where clients 102 have direct disk access. This reduces likelihood that any subsequent lookup or readdir( ) operation requires a server sync to sync data for the directory or the need to read the directory pages from disk. Thus server communications, server synchronous disk IO and client disk IO is reduced, and the reduction can be significant if many changes are being made to the directory by users on the client machine. Furthermore, update requests can still be sent in parallel to the server 104, and readdir( ) and lookup requests only need to wait for an in-progress update if the required directory buffers are not cached (which is less likely due to the invention itself).

Extensible Hashing

The use of extensible hashing algorithms as a method of storing file system directory data is described in U.S. Pat. No. 5,893,086, incorporated herein by reference. As was stated in a paper of Schmuck et al. entitled "GPFS: A Shared-Disk File System for Large Computing Clusters", from USENIX Association, *Proceedings of the FAST* 2002 *Conference on File and Storage Technologies*, January 2002, incorporated by herein reference:

> For directories that occupy more than one disk block, the block containing the directory entry for a particular name can be found by applying a hash function to the name and using the n low-order bits of the hash value as the block number, where n depends on the size of the directory.
>
> As a directory grows, extensible hashing adds new directory blocks one at a time. When a create operation finds no more room in the directory block designated by the hash value of the new name, it splits the block in two. The logical block number of the new directory block is derived from the old block number by adding a '1' in the $n+1^{st}$ bit position, and directory entries with a '1' in the $n+1^{st}$ bit of their hash value are moved to the new block. Other directory blocks remain unchanged. A large directory is therefore, in general, represented as a sparse file, with holes in the file representing directory blocks that have not yet been split. By checking for sparse regions in the directory file, the file system can determine how often a directory block has been split, and thus how many bits of the hash value to use to locate the directory block containing a given name. Hence a lookup always requires a single directory block access, regardless of the size and structure of the directory file.

To be more specific, there is a limit to the number of bits M, that can be used in the hash value, if more names with the same hash value, using at most the M low-order bits of that value, fit in a directory page, an overflow block is linked to the page to contain the additional names. So in very rare cases, more than one block could be accessed on a lookup. The overflow pages are allocated at logical block $2^M$ and higher. Thus the size of the directory can be used as an estimate of how many bits of the hash value are being used. Thus if it is determined that n bits of the hash value are being used, a name is hashed, the low-order n bits are used and the logical page number is examined. If that page does not exist, then the low-order n−1 bits are used to locate the logical page number, if that page does not exist, then the low-order n−2 bits are used to locate the logical page number, and so on, until the page that should contain the name is found. If the page is found, it is searched for the name. If the page has overflow blocks linked to it, they would also be searched.

Since the addition or removal of a name does not normally require the split or merge of logical pages using extensible hashing, parallelism can be allowed for directory updates. To be specific, the server machine for the file system directory could use a multilevel locking scheme when making updates: there would be a main lock on the directory itself, this would be locked in read mode when reading, or making updates to the directory that affected only one directory page; this lock would be obtained in write mode if making an update that split or merged hash buckets (directory pages) or linked an overflow page to a hash bucket. Each directory page could also have a lock associated with it, this would be obtained in read mode when reading and write mode when writing. This allows for parallel updates if the changes are not changing the indirect blocks of the directory. An update that allocated or freed pages of the directory would lock the main lock in write mode guaranteeing single access.

Using a flat file to store names in a directory yields slow search times, to provide fast search times by using an extensible hash directory format, allow parallel updates from client machines to a server 104, ensure the client directory pages remain cached, and minimize the probability that a lookup or readdir( ) request will need to wait for an in-progress update, the invention as described above, can be slightly modified to handle the more complicated extensible hashing layout.

Applying the invention to a directory stored in the extensible hashing method for clients 102 that have direct disk read capability can be accomplished as follows:

1. The data version stored in the inode would only be updated when the main lock was held in write mode at the server 104. Hence it would only be incremented if a page was added or deleted from the directory. Thus this could be considered a major version.
2. Each directory page would contain a data version field; this would be updated after each update to the page. When a page is split, it would start with the initial data version value equal to that of its buddy page (the page it was split from).
3. The server 104 would return the major data version in the inode status on the reply packet just as described in the invention FIG. 4. It would return the page data versions in the actual change log records (described in FIG. 3) or some other convenient method.
4. There would be new change log records, one for a page split, and one for a page merge, these would be very similar to the NEWPAGE and DELPAGE records, but they also tell the client 102 to move entries from the old page to the new page in case of a split or move entries from the deleting page to its buddy page in case of a merge. Thus a merge or split can be compactly represented by a single change log record.
5. The client 102 would keep a main change log queue as shown in FIG. 5, but also keep a change log queue for any pages in memory that had pending updates. Thus there would be a cache of change log queues for a directory, any time a pending update had to be queued, a change log queue would be created, if one did not already exist for the page, and the change log would be queued. A change log is queued on the main queue and any pages updated by that log. Note that only a major version update would affect multiple pages. The queue is of course ordered in major version order. Note that multiple change logs could have the same major version if they hit different pages and had to be queued (because prior updates to the corresponding pages have not been received by the client 102 yet). FIG. 12 shows an example of a directory change log queue for a client machine where the directory is stored using extensible hashing.
6. Overflow pages would still update the minor data version in the first page in the hash bucket and use that pages corresponding change log queue at the client 102.

FIG. 12 shows an example of multiple change log queues. The above example assumes that a directory originally started with 3 defined pages: 0, 1, and 3. Page 2 was not defined. Thus at most 2 bits of the hash value are used to locate a page in this directory. A large number of updates had been sent to the server 104 in parallel. The main CLQUEUE (box 1) keeps a list of all pending change log updates. There are 7 updates pending (boxes 2 through 8). Box 1 shows that the lastApplied major version is 6. Box 6 shows a pending major version change, which is a split of page 3. Since there is change logs already queued at major version 6, the change log for major version 7 had to be queued. Box 9 shows the change log queue for page 0, its lastApplied minor version is 16, thus the change log updates for page 0 (boxes 2, 5 and 8) had to be queued since the reply for update minor version 17 of page 0 has not been received yet. There are no pending changes for page 1 (box 10). Page 3 also has a change log queue (box 11); this page also has updates queued because its lastApplied minor version is 31 and the server 104 reply for update minor version 32 has not been received yet. Note that the change log for the split of page 3 (box 6) will result in the creation of a page 7 (the next bit of the hash value is used for items in page 3, resulting in the bit strings 011 and 111) and 3 bits of the hash value would then be used for lookups.

The above example shows a fundamental requirement for change logs for extensible hashing: Any change logs that need to be queued after a major version update, which is also queued, must be queued even if there is no corresponding page yet defined (since a major version update might cause a split and the creation of a new page). This is done to not lose an update and hence have incorrect data in the cache.

Thus when the reply for major version 6, minor version 17 arrives for page 0, the change logs for boxes 2 and 5 can be processed. Box 8 must still wait until the major version change log is applied. When the reply for major version 6, minor version 32 is received, the remaining change logs can be applied since the major version change would be next in the queue and all the remaining queued change logs can be applied since they will be next in line. Note that after the split of page 3, a change log and directory buffer would exist for page 7, that means the update specified in box 7 could be applied and the update would not be lost.

The update logic for a direct disk access client 102 using extensible hashing would follow much the same flow as FIG. 6, except that change logs would be placed on multiple queues and both the major and minor version of the change log would need to be compared to the major version in the main CLQUEUE and the minor version in the associated page CLQUEUEs to determine if the log could be applied immediately or if it needed to be queued. When applying queued change logs, the major version update could only be applied if there were no other minor version updated preceding it at the old version level.

The readdir( ) and lookup logic for a direct disk access client 102 using extensible hashing would follow the same logic as FIGS. 11 and 10 respectively.

Thus the invention is applicable to many distributed file system environments. It can be effectively used to provide significant performance advantage for simple and complex directory data organizations, and can be used with clients 102 that have no direct disk access and specialized environments where the clients do have direct disk access. While particular embodiments have been shown and described, various modifications will be apparent to those skilled in the art.

What is claimed is:

1. In a distributed file system in which a server system stores a server version of a file system directory, a method for synchronizing a client system with the server version of the file system directory, comprising:

storing a cached client version of the file system directory, the client version reflecting updates to the server version of the file system directory that have been replicated on the client system, wherein the cached client version of the file system directory maintains an updaters count of pending requests from the client system to the server system to update the file system directory;

incrementing the updaters count upon initiating an update request to the server system;

decrementing the updaters count upon processing a reply to the update request from the server system;

maintaining for the file system directory a change log queue containing change logs that have not been applied to the cached client version, each of the change logs in the change log queue specifying one or more updates to the file system directory and specifying an update version;

receiving from the server system a reply to an update request, the reply containing a change log specifying one or more updates to the file system directory and specifying an update version;

comparing the update version specified by the received change log with a stored last applied version specifying a last update version applied to the cached client version of the file system directory;

when the update version specified by the received change log corresponds to a next expected version after the last applied version, applying the updates specified by the change log to the cached client version of the file system directory and incrementing the last applied version; and when the update version specified by the received change log corresponds to a later version than the next expected version, adding the received change log to the change log queue without incrementing the last applied version;

wherein the cached client version of the file system directory maintains a read waiters flag indicating that one or more tasks are waiting to read the file system directory, the method further comprising:

after decrementing the updaters count, determining from the decremented updaters count and the read waiters flag whether the updaters count has been decremented to zero and one or more tasks are waiting to read the file system directory; and when the updaters count has been decremented to zero and one or more tasks are waiting to read the file system directory, resetting the read waiters flag and waking up all such waiting tasks.

2. The method of claim 1, further comprising, following incrementing of the last applied version:

determining whether the change log queue contains a change log specifying an update version corresponding to a next expected version after the last applied version as so incremented; and when the change log queue contains a change log specifying an update version corresponding to such next expected version, processing the change log by applying the updates specified by the change log to the cached client version of the file system directory, removing the change log from the change log queue, and incrementing the last applied version, the determining and the processing being performed iteratively while the change log queue contains a change log specifying an update version corresponding to a next expected version.

3. A tangible computer-readable medium which has a program product stored thereon, comprising a computer-readable program for causing a computer to perform the method steps of claim 1 when the program is run on the computer.

4. A system comprising a processor configured to perform the method steps of claim 1.

5. In a distributed file system in which a server system stores a server version of a file system directory, a method for synchronizing a client system with the server version of the file system directory, comprising:

storing a cached client version of the file system directory, the client version reflecting updates to the server version of the file system directory that have been replicated on the client system, wherein the cached client version of the file system directory maintains an updaters count of pending requests from the client system to the server system to update the file system directory;

incrementing the updaters count upon initiating an update request to the server system;

decrementing the updaters count upon processing a reply to the update request from the server system;

maintaining for the file system directory a change log queue containing change logs that have not been applied to the cached client version, each of the change logs in the change log queue specifying one or more updates to the file system directory and specifying an update version;

receiving from the server system a reply to an update request, the reply containing a change log specifying one or more updates to the file system directory and specifying an update version;

comparing the update version specified by the received change log with a stored last applied version specifying a last update version applied to the cached client version of the file system directory;

when the update version specified by the received change log corresponds to a next expected version after the last applied version, applying the updates specified by the change log to the cached client version of the file system directory and incrementing the last applied version; and when the update version specified by the received change log corresponds to a later version than the next expected version, adding the received change log to the change log queue without incrementing the last applied version;

wherein the cached client version of the file system directory has a lock associated therewith, the method further comprising:

acquiring the lock before incrementing the updaters count;

releasing the lock while awaiting a reply from the server system;

reacquiring the lock upon receiving the reply from the server system; and re-releasing the lock upon processing the reply from the server system and decrementing the updaters count.

6. The method of claim 5, further comprising, following incrementing of the last applied version:

determining whether the change log queue contains a change log specifying an update version corresponding to a next expected version after the last applied version as so incremented; and when the change log queue contains a change log specifying an update version corresponding to such next expected version, processing the change log by applying the updates specified by the change log to the cached client version of the file system directory, removing the change log from the change log queue, and incrementing the last applied version, the determining and the processing being performed iteratively while the change log queue contains a change log specifying an update version corresponding to a next expected version.

7. A tangible computer-readable medium which has a program product stored thereon, comprising a computer-readable program for causing a computer to perform the method steps of claim 5 when the program is run on the computer.

8. A system comprising a processor configured to perform the method steps of claim 5.

9. In a distributed file system in which a server system stores a server version of a file system directory, a method for synchronizing a client system with the server version of the file system directory, comprising:

storing a cached client version of the file system directory, the client version reflecting updates to the server version of the file system directory that have been replicated on the client system, wherein the cached client version of the file system directory maintains an updaters count of pending requests from the client system to the server system to update the file system directory;

incrementing the updaters count upon initiating an update request to the server system;

decrementing the updaters count upon processing a reply to the update request from the server system;

maintaining for the file system directory a change log queue containing change logs that have not been applied to the cached client version, each of the change logs in the change log queue specifying one or more updates to the file system directory and specifying an update version;

receiving from the server system a reply to an update request, the reply containing a change log specifying one or more updates to the file system directory and specifying an update version;

comparing the update version specified by the received change log with a stored last applied version specifying a last update version applied to the cached client version of the file system directory;

when the update version specified by the received change log corresponds to a next expected version after the last applied version, applying the updates specified by the change log to the cached client version of the file system directory and incrementing the last applied version; and when the update version specified by the received change log corresponds to a later version than the next expected version, adding the received change log to the change log queue without incrementing the last applied version;

wherein the cached client version of the file system directory stored by the client system maintains a readers count of tasks reading the file system directory, a read waiters flag indicating that one or more tasks are waiting to read the file system directory, and an update waiters flag indicating that one or more tasks are waiting to read the file system directory, the method further comprising:

upon initiating an update request, determining from the readers count and the read waiters flag whether there are any tasks reading or waiting to read the file system directory;

when there are no tasks reading or waiting to read the file system directory, continuing with the update request; and when there are any tasks reading or waiting to read the file system directory, setting the update waiters flag and suspending further processing of the update request.

10. The method of claim 9, further comprising, following incrementing of the last applied version:

determining whether the change log queue contains a change log specifying an update version corresponding to a next expected version after the last applied version as so incremented; and when the change log queue contains a change log specifying an update version corresponding to such next expected version, processing the change log by applying the updates specified by the change log to the cached client version of the file system directory, removing the change log from the change log queue, and incrementing the last applied version, the determining and the processing being performed iteratively while the change log queue contains a change log specifying an update version corresponding to a next expected version.

11. A tangible computer-readable medium which has a program product stored thereon, comprising a computer-readable program for causing a computer to perform the method steps of claim 9 when the program is run on the computer.

12. A system comprising a processor configured to perform the method steps of claim 9.

* * * * *